UNITED STATES PATENT OFFICE 2,411,158

SATURATED POLYFLUORO CARBONYL COMPOUNDS AND THEIR PREPARATION

William Edward Hanford, Easton, Pa., assignor to E. I. du Pont de Nemours & Company, Wilmington, Del., a corporation of Delaware No Drawing. Application April 23, 1943, Serial No. 484,298

8 Claims. (Cl. 260—586)

This invention relates to the preparation of fluorinated organic compounds and to new organic fluorine compounds. More particularly, the invention comprises a new process for the preparation of polyfluoro carbonyl compounds and includes new chemical products consisting of saturated organic carbonyl compounds containing one or more polyfluoroethylene groups per molecule.

Heretofore the only practical method for preparing fluorine-containing organic compounds has been to replace chlorine with fluorine by means of various inorganic reagents, such as hydrogen fluoride, silver fluoride, antimony fluorides, mercuric fluoride and other metallic fluorides. Such processes yield mixtures of inert products, are very restricted in application and involve considerable expense.

It has also previously been proposed to produce organic fluorine compounds by the reaction of fluorine with various organic materials. Prior investigations have shown that this reaction of fluorine is extremely energetic and generally causes pyrolysis of the organic material, resulting in the formation of carbon, tar or other undesirable carbonaceous decomposition products.

It is an object of this invention to provide a new process for the preparation of saturated organic polyfluoro carbonyl compounds. Another object of this invention is to obtain new compositions of matter consisting of fluorinated organic compounds containing the carbonyl functional group. Still another object is to prepare fluoro carbonyl compounds which have outstanding thermal and chemical stability. A further object is to provide a relatively simple and inexpensive process for readily preparing saturated organic carbonyl compounds containing one or more polyfluoroethylene groups per molecule. A still further object is to obtain saturated organic fluorinated carbonyl compounds possessing many novel and useful properties. Other objects will appear hereinafter.

These objects are accomplished by reacting a polyfluoroethylene containing at least three halogen atoms of which at least two are fluorine with a saturated organic carbonyl compound containing at least two carbon atoms and containing only carbon, hydrogen and oxygen atoms. This reaction produces saturated organic polyfluoro carbonyl products containing at least one polyfluoroethylene unit per molecule of carbonyl reactant. The prefix "poly" as used herein refers to the number of fluorine atoms in the fluoroethylene molecule and not to polymeric materials.

A preferred form of the invention may be carried out by reacting tetrafluoroethylene with a saturated organic carbonyl compound containing at least two carbon atoms and containing only carbon, hydrogen and oxygen atoms, preferably in a closed system and in the presence of a catalyst. Saturated organic polyfluoro carbonyl compounds are obtained containing one or more tetrafluoroethylene units per molecule of carbonyl compound. These resulting products may be represented by the general formula $$H(CF_2CF_2)_nZ$$

where $n$ is a positive integer in the range 1 to about 25, and Z is the complementary portion of the carbonyl reactant, being a monovalent saturated organic radical consisting solely of carbon, hydrogen and oxygen atoms and containing at least two carbon atoms and at least one carbonyl group.

The polyfluoroethylenes suitable for use in this invention may be represented by the general formula $CX_2=CX_2$ where one X is selected from the group consisting of hydrogen and halogen and the other three X's are halogen of which at least two are fluorine.

Saturated organic carbonyl compounds suitable for use in this invention are free of ethylenic and acetylenic linkages, contain at least two carbon atoms and at least one

group and consist of only carbon, hydrogen and oxygen atoms. These saturated organic carbonyl compounds may be acyclic or cyclic, including aliphatic, alicyclic, aromatic and heterocyclic saturated organic carbonyl compounds consisting solely of carbon, hydrogen and oxygen atoms. The general formula ZH may be used to represent these organic carbonyl compounds where Z is the complementary portion of the carbonyl reactant, being a monovalent saturated organic radical consisting solely of carbon, hydrogen and oxygen atoms and containing at least one

group and at least two carbon atoms.

The saturated organic fluorinated carbonyl compounds prepared in accordance with this invention may be represented by the general formula $H(CX_2CX_2)_nZ$ where $n$ is a positive integer in the range 1 to about 25, one X is selected from the group consisting of hydrogen and halogen, the other three X's are halogen of which at least two are fluorine, and Z is the complementary portion of the carbonyl reactant being a monovalent saturated organic radical consisting solely of carbon, hydrogen and oxygen atoms and containing at least one

group and at least two carbon atoms. In the preferred products $n$ is a positive integer in the range 1 to 15.

It is also possible to obtain products in which all of the fluoroethylene units are not necessarily connected together and which may be represented by the general formula

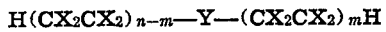

$$H(CX_2CX_2)_{n-m}-Y-(CX_2CX_2)_mH$$

where $n$ is a positive integer in the range 1 to about 25, $m$ is not greater than $n$ and is an integral number in the range from 0 to about 25, one X in each parenthesis is selected from the group consisting of hydrogen and halogen, the other three X's in each parenthesis are halogen of which at least two are fluorine and Y is the complementary portion of the carbonyl reactant, being a divalent saturated organic radical consisting solely of carbon, hydrogen and oxygen atoms and containing at least one

group and at least two carbon atoms. It is to be understood that the units in parentheses correspond to the particular fluoroethylene which is employed in the reaction, although tetrafluoroethylene is the preferred reactant. The sum total of the atoms other than the fluoroethylene units is equivalent to only one molecule of the original organic carbonyl compound. Thus the saturated organic carbonyl compounds in this invention react with a fluorocarbon, such as tetrafluoroethylene, to yield a series of monomeric saturated organic polyfluoro carbonyl compounds.

The following specific example is given to further illustrate the invention:

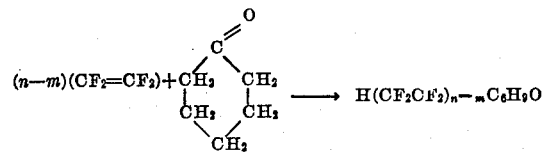

This product may react with additional tetrafloroethylene as illustrated below:

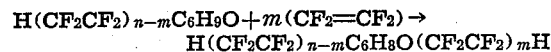

$$H(CF_2CF_2)_{n-m}C_6H_9O + m(CF_2=CF_2) \rightarrow$$
$$H(CF_2CF_2)_{n-m}C_6H_8O(CF_2CF_2)_mH$$

Further reaction with tetrafluoroethylene may also occur. Thus the most general formula representing the new saturated polyfluoro carbonyl products is $H(CX_2CX_2)_{n-m}-V$ where one X is selected from the group consisting of hydrogen and halogen and the other three X's are halogen of which at least two are fluorine, $n$ is the total number of $(CX_2CX_2)$ groups in the compound and is a positive integer in the range 1 to about 25, $m$ is the number of $(CX_2CX_2)$ groups contained in V and is an integral number in the range 0 to about 25 but is not greater than $n$, and V is a monovalent saturated organic radical containing $m(CX_2CX_2)$ groups and at least two carbon atoms exclusive of those present in the $(CX_2CX_2)$ portion of the radical and at least one

group but otherwise consisting solely of carbon, hydrogen and oxygen atoms.

The method for carrying out the reactions varies to some extent with different types of carbonyl compounds, but the usual procedure comprises placing a given amount of a saturated organic carbonyl compound and of a polyfluoroethylene, such as tetrafluoroethylene, with or without a catalyst in a high-pressure reaction vessel and then closing and heating to the desired reaction temperature while mechanically agitating the reaction vessel for several hours.

In order to prepare the low molecular weight products which are characteristic of this invention, it is usually desirable to carry out the reactions under pressure at elevated temperatures. The temperature at which the reaction is effected may be varied over a wide range, depending largely upon the nature of the reactants, the catalyst, the results desired, and other conditions of the reaction. However, the temperature should be below that at which decomposition or pyrolysis of either the reactants or products occurs. No appreciable reaction is obtained below 50° C. and it is usually necessary to heat the reaction mixture to 75° C. or higher in order to obtain a substantial reaction in a reasonable time. The preferred temperature range is 75–250° C., but higher temperatures up to approximately 350° C. are sometimes desirable.

A series of products are usually obtained which vary from liquids to solids depending upon the carbonyl compound and the number of polyfluoroethylene units per molecule of product. In general, the liquid products are compatible with the common organic solvents, whereas the low molecular weight solid products have limited solubility or are insoluble in most solvents.

The invention is further illustrated by the following examples in which the parts are by weight unless otherwise specified.

*Example I*

A silver-lined autoclave was flushed with nitrogen and charged with 146 parts of freshly distilled methyl formate and 1.5 parts of benzoyl peroxide. After pressuring with tetrafluoroethylene to 350 lbs./in.² at 110° C., the autoclave was closed and heated with agitation for 8.5 hours at 110° C. The reaction mixture was steam distilled to yield .4 part of steam-volatile solid melting at about 100° C. and 7.2 parts of non-steam-volatile solid melting at about 250°–260° C.

| | F | C | H | Average ratio $(C_2F_4)/HCOOCH_3$ |
|---|---|---|---|---|
| | Per cent | Per cent | Per cent | |
| Analysis of nonsteam-volatile solid melting at about 250°–260° C. | 69.38 | 25.81 | 0.86 | |
| Calculated for $C_{14}H_4F_{24}O_2$ | 69.1 | 25.45 | 0.61 | 6/1 |

Example II

A mixture of 150 parts of ethyl propionate and 1.5 parts of benzoyl peroxide was reacted with tetrafluoroethylene under 350 lbs./in.² pressure at 110° C. for 9 hours as described in Example I. Steam distillation and removal of the unreacted ethyl propionate gave about 6 parts of steam-volatile liquid products and 7 parts of greasy nonsteam-volatile solid products.

|  | F | C | H | Average ratio $(C_2F_4)/C_2H_5COOC_2H_5$ |
|---|---|---|---|---|
| Analysis of greasy nonsteam-volatile solid products | Per cent 45.58 | Per cent 40.08 | Per cent 3.72 |  |
| Calculated for $C_9H_{10}F_8O_2$ | 50.3 | 35.5 | 3.29 | 2/1 |

The solid products exhibited good lubricating properties.

Example III

A mixture of 150 parts of glacial acetic acid and 1.5 parts of benzoyl peroxide was reacted with tetrafluoroethylene under 350 lbs./in.² pressure at 110° C. for 9 hours. Steam distillation of the reaction mixture yielded 6 parts of nonsteam-volatile solid melting at about 260°–285° C.

|  | F | C | H | Average ratio $(C_2F_4)/CH_3COOH$ |
|---|---|---|---|---|
| Analysis of nonsteam-volatile solid melting at about 260°–285° C. | Per cent 65.03 | Per cent 27.32 | Per cent 0.61 |  |
| Calculated for $C_{10}H_4F_{16}O_2$ | 66.1 | 26.1 | 0.87 | 4/1 |

Example IV

On repeating Example III using 150 parts of propionic acid instead of glacial acetic acid, 2.4 parts of steam-volatile water-insoluble solid melting at about 45°–50° C. and 8 parts of non-steam-volatile solid melting at about 225° C. were obtained. The products were readily soluble in dilute sodium hydroxide and alcohol.

|  | F | C | H | Average ratio $(C_2F_4)/C_2H_5COOH$ |
|---|---|---|---|---|
| Analysis of steam-volatile solid | Per cent 56.22 | Per cent 27.74 | Per cent 1.78 |  |
| Calculated for $C_7H_6F_8O_2$ | 55.4 | 30.65 | 2.19 | 2/1 |
| Analysis of nonsteam-volatile solid | 66.13 | 26.83 | 1.56 |  |
| Calculated for $C_{13}H_6F_{20}O_2$ | 66.2 | 27.2 | 1.05 | 5/1 |

Example V

On repeating Example II using 1000 lbs./in.² tetrafluoroethylene pressure instead of 350 lbs./in.², 10 parts of steam-volatile liquid products and 35 parts of nonsteam-volatile granular solid were obtained.

|  | F | Average ratio $(C_2F_4)/C_2H_5COOC_2H_5$ |
|---|---|---|
| Analysis of nonsteam-volatile granular solid | Per cent 65.03 |  |
| Calculated for $C_{17}H_{10}F_{24}O_2$ | 64.9 | 6/1 |

Example VI

A mixture of 150 parts of diethyl malonate and 1.5 parts of benzoyl peroxide was reacted with tetrafluoroethylene under 350 lbs./in.² pressure at 110° C. for 9 hours. About 1.5 parts of steam-volatile products and 6 parts of waxy nonsteam-volatile solid melting at about 210° C. were obtained.

Example VII

A mixture of 150 parts of ethylene glycol diacetate, 1.5 parts of benzoyl peroxide and 50 parts of tetrafluoroethylene was reacted in an autoclave at 110° C. for 8 hours. There was obtained 1.3 parts of steam-volatile solid melting at about 99° C. and 5 parts of nonsteam-volatile solid melting at about 250°–255° C.

Example VIII

A mixture of 150 parts of cyclohexanone and 1.5 parts of lauroyl peroxide was reacted with tetrafluoroethylene under 350 lbs./in.² pressure at 110° C. for 8.5 hours. There was obtained 10 parts of steam-volatile liquid products which were heavier than water and could be separated by fractional distillation into various fractions corresponding to the 1/1 and higher tetrafluoroethylene/cyclohexanone reaction products.

Example IX

A mixture of 140 parts of methyl ethyl ketone, 1.5 parts of benzoyl peroxide and 50 parts of tetrafluoroethylene was reacted 8.5 hours at 110° C. There was obtained 4 parts of steam-volatile liquid products heavier than water and 7.1 parts of non-volatile solid products melting at about 230° C.

Example X

A mixture of 155 parts of acetic anhydride, 1.5 parts of benzoyl peroxide and 50 parts of tetrafluoroethylene was reacted 9.5 hours at 110° C. There was obtained .5 part of steam-volatile liquid product and 15.4 parts of nonsteam-volatile solid products.

|  | F | Ratio (C$_2$F$_4$)/(CH$_3$CO)$_2$O |
|---|---|---|
| | Per cent | |
| Analysis of steam-volatile liquid products | 45.02 | |
| Calculated for C$_8$H$_6$F$_8$O$_3$ | 50.3 | 2/1 |

Example XI

A mixture of 150 parts of methoxyethyl methoxyethoxy-acetate, 50 parts of tetrafluoroethylene and 1.5 parts of benzoyl peroxide was reacted 10 hours at 110° C. There was obtained 1.5 parts of steam-volatile liquid products heavier than water and 15.2 parts of steam-volatile oil heavier than water which on fractional distillation yielded products with increasing percentage of fluorine with increase in boiling point. Fraction distilling at 125°–139° C./1 mm., $n_D^{25°}$ C. =1.3741, had the following composition:

|  | F | C | H | Ratio (C$_2$F$_4$)/C$_8$H$_{16}$O$_5$ |
|---|---|---|---|---|
| | Per cent | Per cent | Per cent | |
| Analysis of fraction distilling at 125°–139° C./1 mm. | 44.66 | 33.14 | 3.85 | |
| Calculated for C$_{14}$H$_{16}$F$_{12}$O$_5$ | 46.3 | 34.15 | 3.25 | 3/1 |

Among the polyfluoroethylenes which are applicable in this invention are trifluorochloroethylene, difluorodichloroethylene, trifluorobromoethylene and trifluoroethylene. However, polyfluoroethylenes containing three fluorine atoms react more readily than the difluoroethylenes. Tetrafluoroethylene is particularly preferred as it reacts the most readily.

The preferred saturated organic carbonyl compounds are those containing a single

group per molecule. Ketones are a particular preferred class of compounds for use in this invention. However, the invention is applicable to other saturated organic carbonyl compounds containing at least two carbon atoms and containing only carbon, hydrogen and oxygen atoms, such as aldehydes, including for example, acetaldehyde, propionaldehyde, n-butyraldehyde, isobutyraldehyde, heptaldehyde and lauraldehyde; ketones, including for example, acetone, methyl ethyl ketone, methyl propyl ketone, diethyl ketone, methyl isobutyl ketone, methyl tert.-butyl ketone, diisopropyl ketone, methyl nonyl ketone, laurone, stearone, cyclohexanone and acetophenone; carboxylic acids, including for example, acetic, propionic, isobutyric, pivalic, caprylic, lauric, stearic, adipic and sebacic acids; carboxylic acid anhydrides, such as acetic, propionic, succinic and glutaric anhydrides; and esters of carboxylic acids, including for example, methyl formate, ethyl acetate, methyl propionate, methyl isobutyrate, ethyl butyrate, lauryl acetate, phenyl acetate, diethyl oxalate, diethyl malonate; diethyl succinate, diethyl adipate, dimethyl sebacate, methylene diacetate, ethylene glycol diacetate, ethyl benzoate and ethyl furoate. Of the aromatic compounds, those containing an aliphatic radical such as acetophenone, phenyl acetate and ethyl benzoate are preferred as they react more readily. Carbonyl compounds of higher molecular weight which are operable in the process of this invention include the esters of mono-, di- and polysaccharides such as glucose pentaacetate, sucrose octaacetate and cellulose acetate; and polyvinyl acetate.

It is often desirable to use a catalyst, although a catalyst is not always necessary. A wide variety of catalysts are operable including organic and inorganic peroxygen compounds, alkaline catalysts, and various acid type catalysts. The peroxygen type catalysts are preferred for use in this invention and examples of them are diacyl peroxide, benzoyl peroxide, lauroyl peroxide, ethyl peroxide, sodium peroxide, hydrogen peroxide, barium peroxide, oxygen, ozone, air and ammonium persulfate. Examples of alkaline catalysts for use in this invention are borax, disodium phosphate, sodium alcoholate, hydrazine, hydrazine salts, trimethylamine oxide, hexachloroethane-trimethylamine oxide, hexachloroethane, hexachloroethane - borax and peroxide-borax. Among the acid type catalysts which may be used in this invention are Friedel-Crafts type catalysts, zinc chloride and phosphoric acid.

The proportion of catalyst may vary within relatively wide limits depending largely upon the nature of the reactants and the products desired. Although efficient reaction may be effected without the use of catalysts, it is generally preferred to employ a catalyst in this invention. Furthermore, the use of small amounts of catalyst reduces the temperature, time and cost of operation. Highly desirable results may be obtained with the use of an amount of catalyst corresponding to about .001 to 10.0% by weight of the reactants employed. Advantageous results are also sometimes obtained by using a combination of catalysts.

Although a mixture of saturated organic carbonyl compounds may be employed in this invention, it is preferable to use a single saturated organic carbonyl compound. It is also preferable that the carbonyl compounds not be contaminated with other type organic compounds. Generally a relatively large molar excess of the carbonyl reactant is used as compared to the more expensive polyfluoroethylene in order to prepare low molecular weight products. However, the desired products may often be obtained by using a relatively small amount of the organic carbonyl compounds since the ratio of polyfluoroethylene units per unit of carbonyl compound in the products varies from 1 to about 25 depending upon the conditions. Usually the molar ratio of carbonyl compound to polyfluoroethylene in the reaction mixture may vary from .04 to 20 but it is preferable to work in the range .1 to 10 in order to obtain the low molecular weight products which are characteristic of this invention.

It will be understood that the operating conditions may vary widely depending upon the nature of the compounds being reacted and also upon the results desired. The time required for carrying out the reactions may vary from a few minutes to several days depending upon the nature of the reactants and the other operating conditions such as temperature, pressure and catalyst.

The process may be operated continuously or intermittently. The reaction may be carried out in a closed system or the reaction may be carried out in the vapor phase by mixing the vapors of the organic carbonyl compound and polyfluoroethylene and passing the mixture of vapors through a hot reaction tube which if desired may contain a catalyst. The reaction may be carried out under subatmospheric, atmospheric, or superatmospheric pressure in the range of .1 to 1000 atmospheres. The preferred pressure range is 1 to 200 atmospheres.

Although there is no objection to the presence of small amounts of water in carrying out the process of this invention, it is preferable that the reaction be conducted under substantially anhydrous conditions. However in certain instances, the presence of water may be advantageous to help dissipate the heat of the reaction.

The reactions may be carried out in any suitable reaction vessel, such as stainless steel, iron, silver, aluminum and other metals and alloys which are capable of withstanding heat and pressure. The reaction is preferably carried out with agitation, although agitation is not always necessary.

The present invention is useful for the production of a wide variety of organic fluoro-substituted carbonyl compounds. Although it is understood that usually a mixture of compounds with varying ratios of fluoroethylene units per carbonyl molecule is obtained, the mixture can generally be separated into various definite fractions by various methods such as steam distillation, fractional distillation, extraction and fractional crystallization. Products with a given ratio of polyfluoroethylene units per molecule of carbonyl compound can often be prepared by the proper choice of conditions and catalyst. Increase in pressure favors an increase in molecular weight and thus a higher ratio of fluoroethylene units per molecule of product.

The products can readily be distinguished from the reactants by analysis and by their physical properties. In general, the specific gravity and stability of the products increase while the refractive index decreases with increase in percentage of fluorine in the products. The products of this invention vary from liquids to relatively low molecular weight solids which usually soften or melt below 300° C. when heated in air on a copper block. The liquid products are generally compatible with the common organic solvents but the solid products have a rather limited solubility in most solvents.

The reaction and the separation or isolation of the products may be carried out simultaneously or in separate steps. The products may be separated by filtration, extraction, distillation or crystallization depending upon the nature of the products.

The products of this invention are useful for various commercial purposes. Since all of the products of this invention are extremely stable, they are generally applicable for use as solvents and reaction media. Many of the products have been found to be very desirable in that they are substantially non-flammable, non-corrosive and non-toxic. The saturated organic fluoro carbonyl products of this invention are useful as lubricants since they have outstanding thermal and chemical stability.

This invention is particularly advantageous in that it affords a safe, flexible, practical and economical process for producing highly fluorinated saturated organic carbonyl compounds. One of the advantages of this invention is that the process may be operated with none or a relatively small amount of catalyst and the reaction proceeds smoothly and easily without undesirable side reactions.

As many apparently widely different embodiments of this invention may be made without departing from the spirit and scope thereof, it is to be understood that I do not limit myself to the specific embodiments thereof except as defined in the appended claims.

I claim:

1. The process for obtaining a mixture of tetrafluoroethyl carbonylic compounds which comprises heating tetrafluoroethylene with a saturated organic compound of at least two carbon atoms containing only carbon, hydrogen and oxygen selected from the class consisting of aliphatic and cycloaliphatic acids, esters and ketones, the mole ratio of said saturated carbonylic compound to said tetrafluoroethylene being from .1 to 10, said heating being effected in the presence of a peroxygen catalyst at a temperature within the range of from 50° C. to 350° C.

2. The process for obtaining a mixture of tetrafluoroethyl carbonylic compounds which comprises heating tetrafluoroethylene with a saturated aliphatic ketone containing only carbon, hydrogen and oxygen, the mole ratio of said ketone to said tetrafluoroethylene being from .1 to 10, said heating being effected under pressure in the presence of a peroxygen catalyst at a temperature within the range of from 75° C. to 250° C.

3. The process for obtaining a mixture of tetrafluoroethyl carbonylic compounds, which comprises heating tetrafluoroethylene with a saturated cycloaliphatic ketone containing only carbon, hydrogen and oxygen, the mole ratio of said ketone to said tetrafluoroethylene being from .1 to 10, said heating being effected under pressure in the presence of a peroxygen catalyst at a temperature within the range of from 75° C. to 250° C.

4. The process for obtaining a mixture of tetrafluoroethylcarbonylic compounds, which comprises heating tetrafluoroethylene with cyclohexanone, the mole ratio of said cyclohexanone to said tetrafluoroethylene being from .1 to 10, said heating being effected under pressure in the presence of lauroyl peroxide at a temperature within the range of from 75° C. to 250° C.

5. A mixture of saturated organic tetrafluoroethyl compounds having the following general formula:

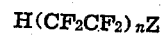

wherein ZH is a saturated organic compound of at least two carbon atoms containing only carbon, hydrogen and oxygen selected from the class consisting of aliphatic and cycloaliphatic acids, esters and ketones, and $n$ is an integer between 1 and 25.

6. A mixture of saturated organic tetrafluoroethyl compounds having the following general formula:

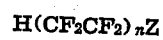

wherein ZH is a saturated aliphatic ketone containing only carbon, hydrogen and oxygen, and $n$ is an integer between 1 and 25.

7. A mixture of saturated organic tetrafluoroethyl compounds having the following general formula:

$$H(CF_2CF_2)_nZ$$

wherein ZH is a saturated cycloaliphatic ketone containing only carbon, hydrogen and oxygen, and $n$ is an integer between 1 and 25.

8. A mixture of saturated organic tetrafluoroethyl compounds having the following general formula:

$$H(CF_2CF_2)_nZ$$

wherein ZH is cyclohexanone and $n$ is an integer between 1 and 25.

WILLIAM EDWARD HANFORD.